(12) United States Patent
Albright et al.

(10) Patent No.: US 8,454,114 B2
(45) Date of Patent: Jun. 4, 2013

(54) APPLYING BONDING AGENT FOR SUPPLEMENTAL INK

(75) Inventors: Stephen L. Albright, Corvallis, OR (US); Kevin G. Currans, Philomath, OR (US); Jose M. Galmes, San Diego, CA (US); Santiago Garcia-Reyero Vinas, San Diego, CA (US); Matthew Alan MacClary, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 67 days.

(21) Appl. No.: 13/158,035

(22) Filed: Jun. 10, 2011

(65) Prior Publication Data

US 2012/0313988 A1 Dec. 13, 2012

(51) Int. Cl.
*B41J 2/21* (2006.01)
(52) U.S. Cl.
USPC .......................................................... 347/15

(58) Field of Classification Search
CPC ............................... B41J 2/2103; B41J 2/2114
USPC ........................................ 347/7, 14, 15, 19
See application file for complete search history.

(56) References Cited

U.S. PATENT DOCUMENTS

| 7,522,869 B2 | 4/2009 | Anderson et al. |
| 8,009,316 B2 * | 8/2011 | Varga ........................... 358/1.17 |
| 2009/0117340 A1 | 5/2009 | Halfyard et al. |
| 2009/0130302 A1 | 5/2009 | Halfyard et al. |
| 2009/0321676 A1 | 12/2009 | Breton et al. |

* cited by examiner

*Primary Examiner* — An Do

(57) ABSTRACT

A method for applying a bonding agent for supplemental ink includes, with a control system of a printing apparatus, determining regions of an image corresponding to regions where a supplemental ink is to be printed, and with the control system, adding an amount of pixels of a standard color channel to portions of a bitmap representing the image, the portions corresponding to the regions where the supplemental ink is to be printed. The amount of pixels is sufficient to trigger application of a bonding agent at the regions.

20 Claims, 4 Drawing Sheets

APPLYING BONDING AGENT FOR SUPPLEMENTAL INK

BACKGROUND

Printing systems are designed to print a full range of colors by combining primary colors, such as Cyan, Yellow, Magenta, and Black (CYMK). In some cases, printing systems may be designed to print a supplemental ink for specific purposes other than what is used for the color scheme. For example, some printing systems may use a supplemental ink such as magnetic ink to be used in a Magnetic Ink Character Recognition (MICR) system.

BRIEF DESCRIPTION OF THE DRAWINGS

The accompanying drawings illustrate various examples of the principles described herein and are a part of the specification. The drawings are merely examples and do not limit the scope of the claims.

Throughout the drawings, identical reference numbers designate similar, but not necessarily identical, elements.

DETAILED DESCRIPTION

Figure 1:
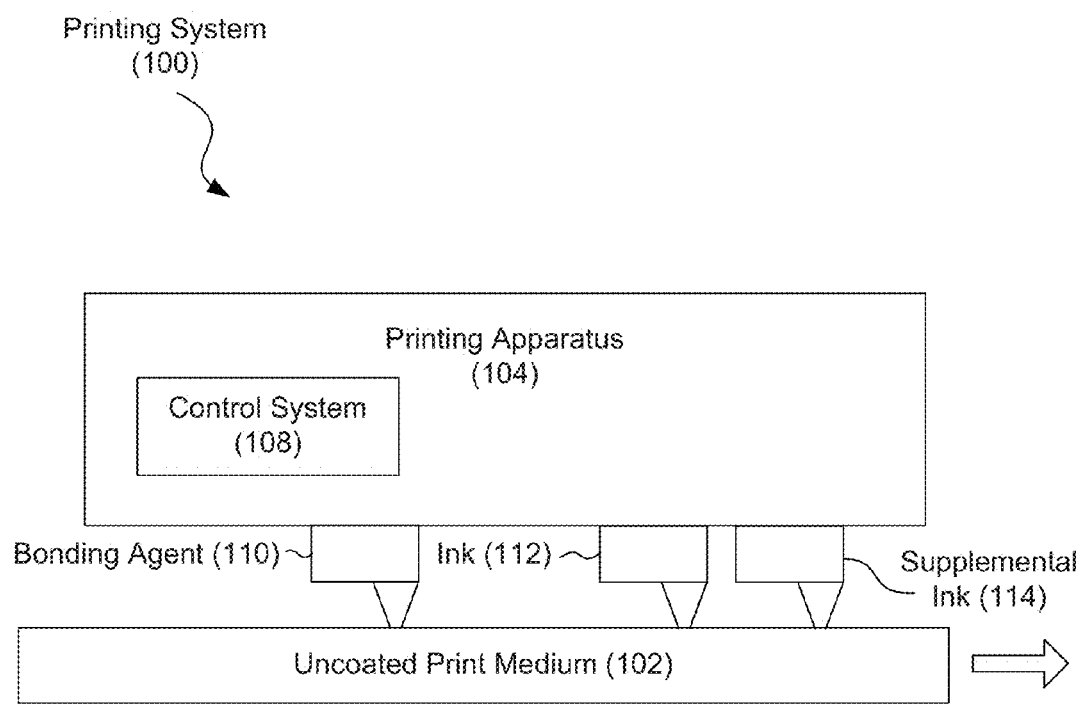
FIG. 1 is a diagram showing an illustrative printing system, according to one example of principles described herein.

As mentioned above, printing systems may be designed to use a supplemental ink such as magnetic ink to be used in a Magnetic Ink Character Recognition (MICR) system. MICR systems are used to satisfy standards of the American Banking Association for printing numbers on checks or other transactional material. These numbers include routing numbers and account numbers. A special font, such as E13-B, is used to print these numbers with the magnetic ink. When being fed through a MICR reader system, the magnetic ink is first polarized. The resulting signal is then read by a magnetic reader system. The signal shape produced by the each of the numbers creates a unique characteristic wave form for each number that is readily identifiable by the MICR reader. Such systems are more accurate and less costly than standard Optical Character Recognition Systems and can be processed much faster.

In order for the magnetic signal from the magnetic ink to be effectively read, the magnetic signal should be of sufficient strength. The strength of the magnetic signal can be directly affected by the print medium on which the magnetic ink is printed. Specifically, absorption of the ink into the print medium reduces the signal strength. Thus, it is desirable to minimize the absorption of the magnetic ink into the print medium. If too much magnetic ink is absorbed into the paper, it will not produce a strong enough magnetic signal to meet the standards set for reading MICR lines. Entities that print checks and other documents that use MICR strongly desire to avoid misreads as they are often charged a fee by banks and other institutions if the MICR readers are unable to read the MICR print.

One way in which the absorption of the magnetic ink may be limited is to use a print medium such as paper that is treated with a particular substance that limits the absorption. However, using such substances increases the cost of the printing paper and thus those who print checks and other documents using magnetic ink would prefer to use an untreated paper.

Some printing systems are fitted with a subsystem that applies a bonding agent to the uncoated print medium before the ink is applied. Specifically, as the print medium is being fed through the printing apparatus, a bonding agent is applied to the precise regions of the print medium where ink is to be placed. The bonding agent then limits the absorption of the ink into the paper and enhances print quality on untreated paper. The bonding agent subsystems are designed to apply the bonding agent only where the standard colors of the color scheme are to be placed. Thus, if a supplemental ink such as magnetic ink is added to the print apparatus, the bonding agent subsystem will not apply the bonding agent to the precise regions where the magnetic ink is to be placed.

In light of this and other issues, the present specification discloses methods and systems for printing supplemental ink on uncoated papers without using a new bonding agent subsystem. According to certain illustrative examples, the system responsible for processing a print job will determine the colorant of the objects within the image to be printed. If a colorant that indicates a supplemental ink such as magnetic ink for MICR characters is present, then the system will automatically add another colorant such as black to correspond with the regions that are colored with the supplemental ink colorant. This will trigger application of the bonding agent at these regions.

For example, in the bitmap file that represents the image to be printed, the system can add a small amount of data to the black color channel in regions where the magnetic ink is to be printed. A bitmap file is a digital representation of the image to be printed that informs the printer what ink colors are to be printed at each unit of resolution for the printer. The amount of pixels added to the black color channel may be only enough to trigger application of the bonding agent. This may range from about 4-5 percent of a full black color. Thus, a small amount of black ink will be printed at the precise regions where the magnetic ink will be placed. Printing this small amount of black ink at these regions will trigger application of the bonding agent at those regions so that the magnetic ink will not be too deeply absorbed into the uncoated print medium.

Through use of methods and systems described herein, a printing apparatus can be designed to print a supplemental ink such as magnetic ink that will not be too deeply absorbed into an uncoated print medium. Furthermore, no changes to the bonding agent subsystem will have to be made. Users of such printing systems will be able to use uncoated print media. These cost reductions are achieved without losing appropriate signal strength in the magnetic ink characters that will be read by the MICR readers.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Throughout this specification and in the appended claims, the term "ink" refers to any type of marking fluid or marking substance that is printed onto a print medium such as paper.

Throughout this specification and in the appended claims, the term "supplemental ink" refers to any type of ink that is not part of the standard color scheme. One example of a supplemental ink is a magnetic ink such as that used in MICR systems.

Throughout this specification and in the appended claims, the term standard color refers to a color that is used in a printing color scheme as one of many standard colors that can be combined to produce a range of colors. One example of a standard color is the black color from a CYMK color scheme.

FIG. 1 is a diagram showing an illustrative printing system (100). According to certain illustrative examples, the printing system (100) includes a printing apparatus (104) with a control system (108). The printing apparatus (104) also includes a bonding agent application subsystem (110), an ink application subsystem (112), and a supplemental ink application subsystem (114). The printing apparatus can be designed to print onto an uncoated print medium (102) that moves in relation to the bonding agent, standard ink, and supplemental ink application systems.

The control system (108) includes the hardware and software that are used to prepare color frames used in the operation of the printing apparatus. The hardware typically includes a computer processor and some form of computer memory. In some cases, the processing of files to be printed may be performed by software installed on a computing system connected to the printing apparatus. Alternatively, the hardware and software for processing a print job may be within the printing apparatus itself. The software that processes documents for printing is referred to as the Digital Front End (DFE).

The control system (108) may also include a Raster Image Processor (RIP). The RIP performs a rasterizing process on a document when it is first sent to the printer to be printed. Rasterizing is the process by which the Page Description Language (PDL) of an image file is transformed into a bitmap format. A bitmap format represents the image to be printed as a two dimensional array of pixels. Each pixel is given a specific color. The RIP is programmed to take the image and other metadata delivered in the PDL and determine the regions on the print medium (102) where ink of each color is to be combined in order to form the appropriate image.

Printing systems such as Inkjet printing systems that use subtractive color principals for reproduction of color typically include a set of standard colors. These standard colors are cyan, magenta, yellow and black. These colors can be combined to form a variety of colors which may be used to form color images. Using such a color scheme, the RIP will divide the image file into four separate components, each component representing the regions where that color should be placed in order to form the final image. These separate components are referred to as color channels. Thus, the RIP divides the bitmap formatted image into the four separate color channels and sends the data to standard color ink subsystem (112). The process of combining the proper density of each color to form the desired image is referred to as halftoning. The halftoning process may be done by either software or hardware of the printing system.

The standard color ink subsystem (112) includes a set of ink nozzles for each color of the color scheme. As a print medium (102) moves in relation to the ink nozzles of the standard ink subsystem (112), the nozzles will eject small droplets of ink onto the print medium at the appropriate regions in order to form an appropriate image. If the print medium is an uncoated paper, then the ink will be partially absorbed into the paper which results in a reduction of image quality.

As mentioned above, to prevent the ink from absorbing into the uncoated paper (102), a bonding agent is applied to the regions where ink from the standard color ink subsystem (112) is placed. The hardware, software and firmware of the bonding agent subsystem (110) are typically designed to mimic the standard ink color subsystem (112) to determine where bonding agent should be placed. Specifically, if a certain amount of ink is to be placed at a certain region by the standard ink color subsystem, then the bonding agent subsystem (110) will also place bonding agent at that region. Thus, the control system (108) does not have to process a separate set of data for the bonding agent subsystem (110).

If a printing system is designed to use a supplemental ink subsystem (114), then the bonding agent subsystem (110) would have to be redesigned to also trigger application of the bonding agent at regions where the supplemental ink is placed. In order to avoid the cost of redesigning the bonding agent subsystem, the present specification teaches methods and systems for printing the supplemental ink and triggering application of the bonding agent without redesigning the bonding agent subsystem (110).

The supplemental ink subsystem is designed to place ink at the appropriate regions. For example, in the case that the supplemental ink is a magnetic ink for a MICR reader system, then the magnetic ink will be used to form the numbers on a printed check as used by the banking industry. The processing system (108) is designed to handle the placement of the magnetic ink through an additional color channel.

When the RIP is processing the data from the bitmap image that determines where each standard color is to place ink onto the print medium (102), the RIP processor can add a small amount of pixels to one of the standard color channels. The RIP will add these pixels at the same regions where the magnetic ink from the supplemental ink subsystem is to be placed. For example, the RIP may add a small amount of black pixels to the black color channel of the CYMK color scheme. Thus, when a check is being printed, a small amount of black pixels will be placed at the regions where the magnetic ink numbers will be placed. The amount of pixels added can be sufficient to trigger application of the bonding agent at those regions. Thus, at the regions where the magnetic ink is to be placed, there will be a small amount of black or other colored ink applied as well as the bonding agent.

Figure 2:
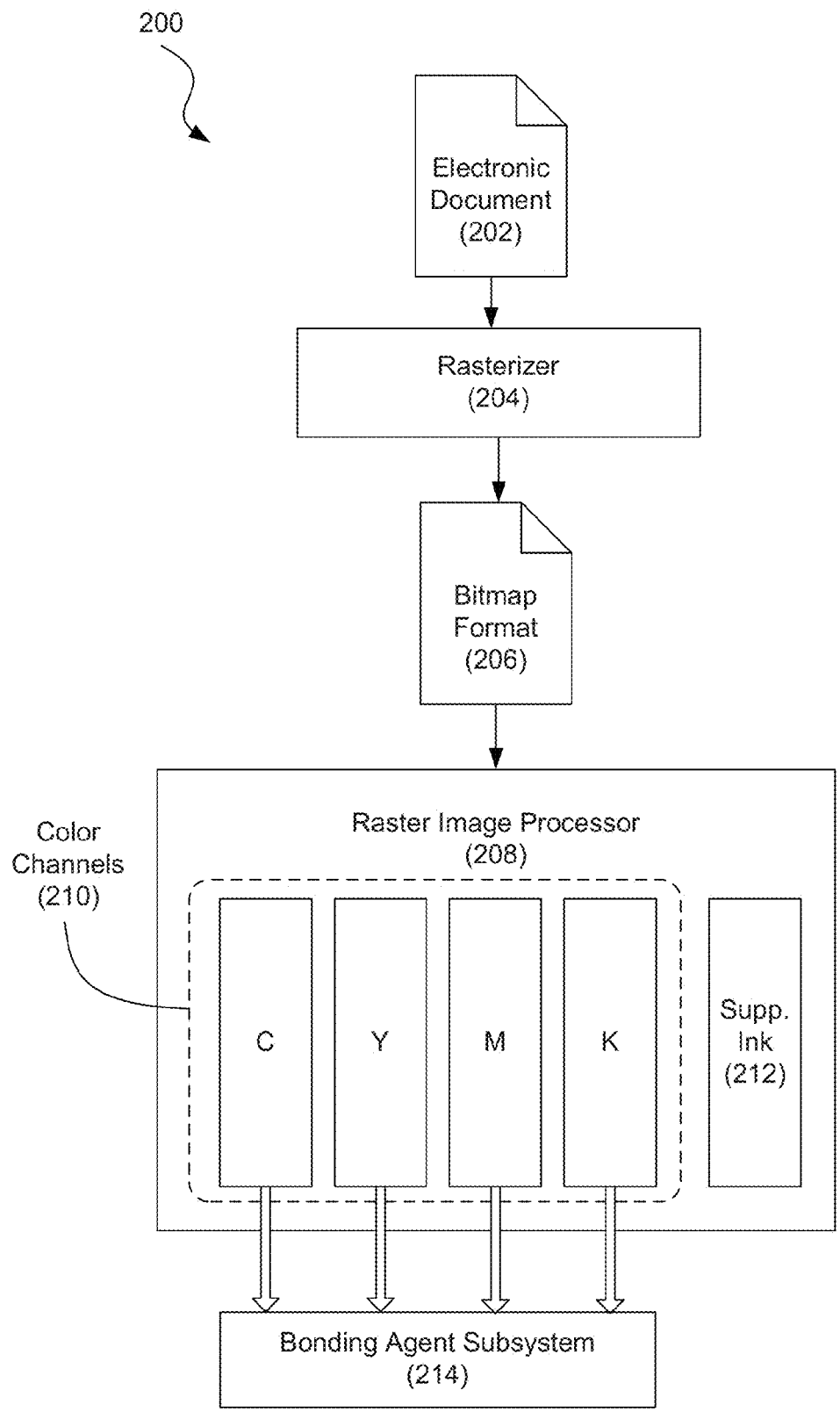
FIG. 2 is a diagram showing an illustrative processing of an image that includes regions to be printed with a supplemental ink, according to one example of principles described herein.

FIG. 2 is a diagram showing an illustrative processing (200) of an image that includes regions to be printed with a supplemental ink. According to certain illustrative examples, an electronic document (202) that is sent to a printer is first sent to a rasterizer (204) to place it into a bitmap format (206). The rasterizing function may be performed by the computing system that sends the electronic document to the printer. Alternatively, the printing system itself may perform the rasterizing process. The electronic document has to be rasterized because electronic documents are often stored in a PDL format. The PDL format may describe the image using text and vector descriptions. In a vector description, lines and objects are represented as vectors rather than by individual pixels.

A bitmap file stores color data for each pixel within the image. Each pixel digitally represents intensity of the primary colors that form the image. For example, in the case of using a CYMK color scheme, each pixel stores an intensity level for all four colors. Each intensity level may be an 8-bit value.

Thus, each pixel would be a 32 bit value. In order to reduce the size of a bitmap file, the commonly used colors within the image may be stored as a color palette. The individual pixels may then just index the appropriate color within the palette instead of storing redundant data. The colors within the color palette are sometimes referred to as named colors.

After the electronic document has been placed into a bitmap format, the RIP (208) can process the image data for each color. As mentioned above, the RIP divides the color data into separate color channels (210). The data for each color channel specifies the regions on the print medium where that color should be placed. The RIP (208) will further process the data that indicates where the supplemental ink (212) should be placed.

As mentioned above, the bonding agent subsystem (214) will be triggered to apply bonding agent at regions where ink from one of the standard color channels (210) will be placed. In order to trigger the application of the bonding agent for the supplemental ink (212), the RIP can add a small amount of pixels to one of the standard color channels at the appropriate regions.

In one example, the regions within the bitmap where the supplemental ink is to be placed can be represented by a named color. The named color can instruct the RIP (208) to apply the full amount of supplemental ink at the appropriate regions and about 5% of the full value for one of the other color channels (210). Applying a full value of ink to a region means that the ink will be placed at every point on the print medium that corresponds to a pixel. Thus, a full value of ink will be readily apparent to the human eye. In contrast, regions where a smaller percentage of the full value such as 5% may be more difficult for the human eye to see because a much smaller number of ink droplets are ejected onto those regions.

Figure 3A:
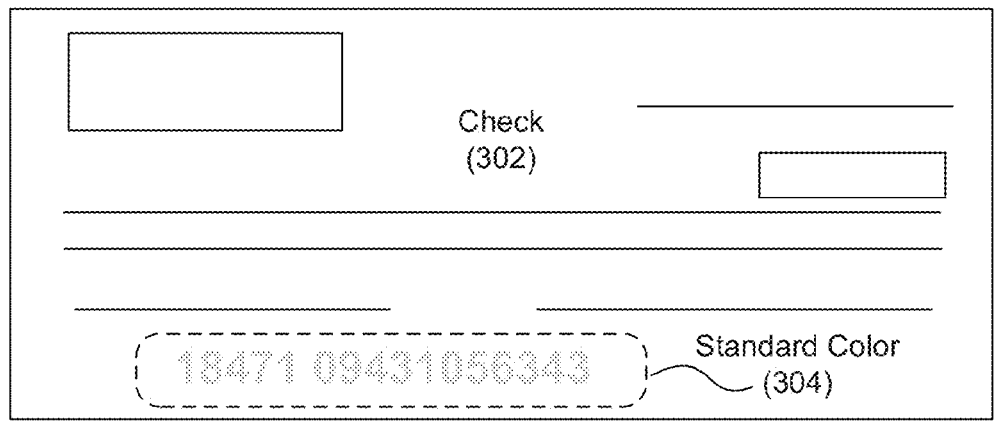
FIG. 3A is a diagram showing an illustrative printed image before the supplemental ink is printed, according to one example of principles described herein.

FIG. 3A is a diagram showing an illustrative printed image (300) before the supplemental ink is printed. According to one illustrative example, an image such as the face (302) of a check is printed onto a print medium. The numbers that use the MICR technology and are thus printed with the magnetic ink are typically placed along the bottom of the check. As the print medium (e.g. 102, FIG. 1) passes beneath the ink nozzles of the standard ink colors, the numbers will be printed onto the print medium using a standard color (304) such as black. However, a relatively small amount of ink will be placed. The amount of ink placed onto the print medium will be enough so that the application of the bonding agent will be triggered and applied to the corresponding regions on the print medium.

Figure 3B:
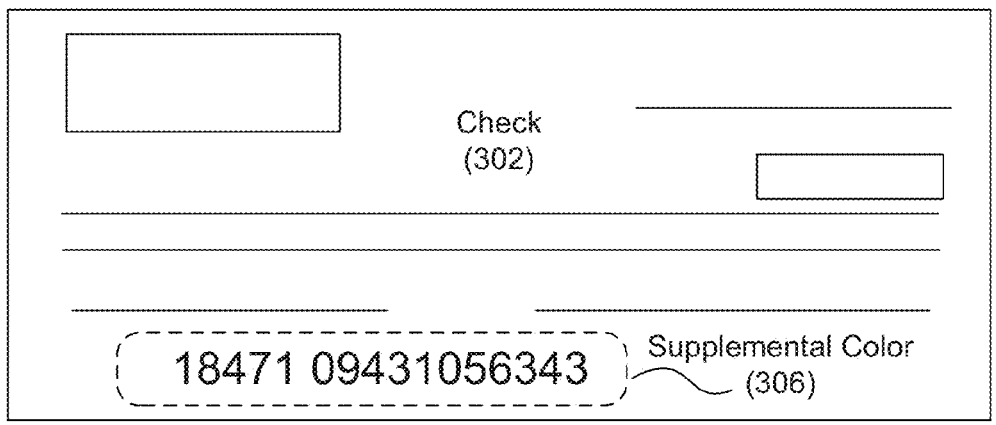
FIG. 3B is a diagram showing an illustrative printed image after the supplemental ink is printed, according to one example of principles described herein.

FIG. 3B is a diagram showing an illustrative printed image (310) after the supplemental ink is printed. According to certain illustrative examples, after the small amount of standard color ink is used to print the numbers, the print medium will continue to move in relation to the printing apparatus and will pass beneath the ink nozzles of the supplemental ink system (e.g. 114, FIG. 1). The supplemental ink system may then print the numbers with the magnetic ink over the numbers which have already been printed using the standard ink. Because the standard color ink has triggered application of the bonding agent, the magnetic ink will be prevented from being absorbed too deeply into the print medium. Thus, when the check is passed under a MICR reader, the numbers will produce a strong enough magnetic signal to be appropriately read.

In some cases, the supplemental ink may be printed before the standard ink color is printed. The supplemental ink would then still be printed after the bonding agent has been applied to the appropriate regions. Additionally, any standard ink color may be used to trigger application of the bonding agent to the regions where the magnetic ink will be placed. The option of which color to use may be a printer setting that may be changed by the user.

Figure 4:
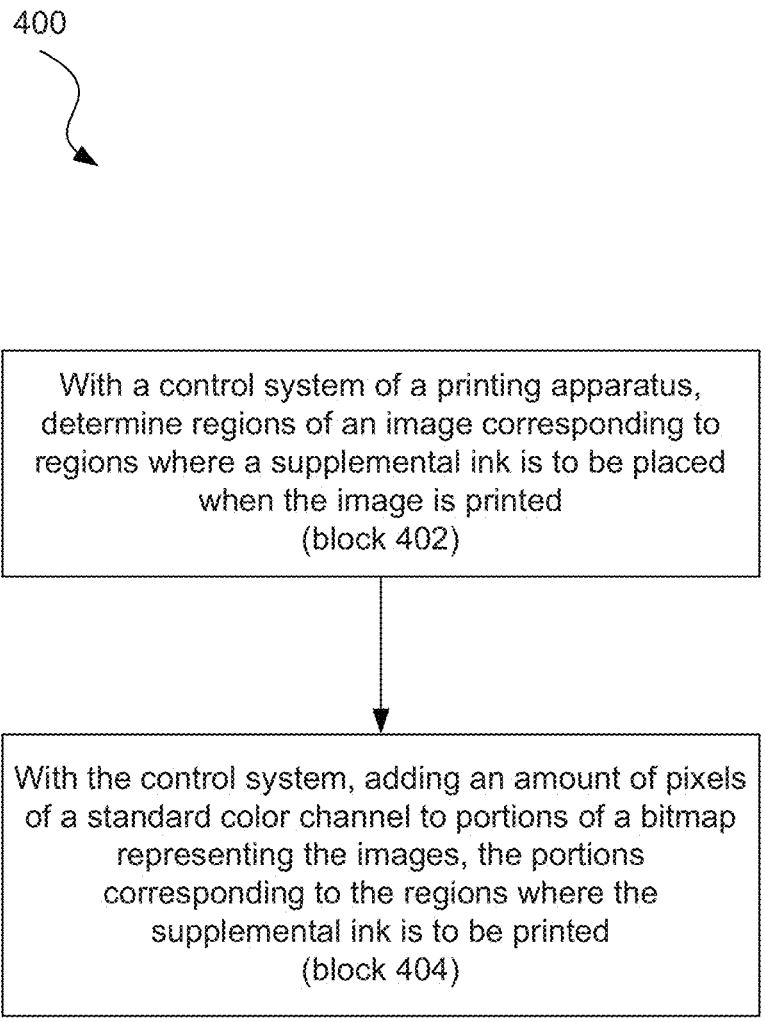
FIG. 4 is a flowchart showing an illustrative method for printing supplemental ink, according to one example of principles described herein.

FIG. 4 is a flowchart showing an illustrative method for printing supplemental ink. According to certain illustrative examples, the method includes, with a control system of a printing apparatus, determining (block 402) regions of an image corresponding to regions where a supplemental ink is to be placed when the image is printed, and adding (block 404) an amount of pixels of a standard color channel to portions of a bitmap representing the images, the portions corresponding to the regions where the supplemental ink is to be printed. The amount of ink added is sufficient to trigger application of the bonding agent at those regions.

In conclusion, through use of methods and systems described herein, a printing apparatus can be designed to print a supplemental ink such as magnetic ink that will not be too deeply absorbed into uncoated print media. Furthermore, no changes to the bonding agent subsystem will have to be made. Users of such printing systems will be able to use uncoated print media while using a minimal amount of magnetic ink. These cost reductions are achieved without losing appropriate signal strength in the magnetic ink characters that will be read by the MICR readers.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for applying a bonding agent for supplemental ink, the method comprising:
    with a control system of a printing apparatus, determining regions of an image corresponding to regions where a supplemental ink is to be printed; and
    with said control system, adding an amount of pixels of a standard color channel to portions of a bitmap representing said image, said portions corresponding to said regions where said supplemental ink is to be printed;
    wherein said amount of pixels is sufficient to trigger application of a bonding agent at said regions.

2. The method of claim 1, wherein said printing system applies said bonding agent only at regions where standard colors of a standard color scheme are to be placed.

3. The method of claim 1, wherein said supplemental ink comprises a magnetic ink for a Magnetic Ink Character Recognition (MICR) system.

4. The method of claim 1, wherein said standard color is part of a Cyan Magenta Yellow Black (CMYK) color scheme.

5. The method of claim 4, wherein said standard color channel is a black color channel of said CMYK color scheme.

6. The method of claim 1, further comprising determining if an input file to said printing system uses a supplemental ink named color, said named color instructing said control system to apply a full value of supplemental ink and said amount of said standard color.

7. The method of claim 1, wherein the amount of pixels added to the standard color channel is 4 to 5% of a full application of that standard color.

8. The method of claim 1, further comprising applying said bonding agent to regions of a print medium for which said bitmap indicates the printing of pixels of a standard color channel including said added pixels corresponding to regions where said supplemental ink is to be printed.

9. The method of claim 8, further comprising:
after applying said bonding agent, printing portions of said print medium with a supplemental ink as directed by said bitmap; and,
after applying said bonding agent and printing with said supplemental ink, printing standard color channels of said image according to said bitmap.

10. A printing system comprising:
a control system comprising:
a processor; and
a memory communicatively coupled to said processor;
in which said processor is programmed to:
determine regions of an image corresponding to regions where a supplemental ink is to be printed; and
add an amount of pixels of a standard color channel to portions of a bitmap representing said image, said portions corresponding to said regions where said supplemental ink is to be printed;
wherein said amount of pixels is sufficient to trigger application of a bonding agent at said regions.

11. The system of claim 10, wherein a bonding agent application subsystem of said printing system applies said bonding agent only at regions where standard colors of a standard color scheme are to be placed.

12. The system of claim 10, wherein said supplemental ink comprises a magnetic ink for a Magnetic Ink Character Recognition (MICR) system.

13. The system of claim 10, wherein said standard color is part of a Cyan Magenta Yellow Black (CMYK) color scheme.

14. The system of claim 13, wherein said standard color channel is a black color channel of said CMYK color scheme.

15. The system of claim 10, wherein said processor is further programmed to determine if an input file to said printing system uses a supplemental ink named color, said named color instructing said control system to apply a full value of supplemental ink and said amount of said standard color.

16. The system of claim 10, further comprising a bonding agent applicator under control of said processor for applying bonding agent to portions of a print medium which, according to said bitmap, will be printed with ink according to a standard color channel, including said amount of pixels added to portions of said bitmap representing regions where said supplemental ink is to be printed.

17. The system of claim 10, wherein the amount of pixels added to the standard color channel is 4 to 5% of a full application of that standard color.

18. A method for printing magnetic ink, the method comprising:
with a control system of a printing apparatus, determining regions of an image corresponding to regions where a magnetic ink is to be printed when said image is printed; and
with said control system, adding an amount of pixels of a black color channel of a standard color scheme to portions of a bitmap representing said images, said portions corresponding to said regions where said magnetic ink is to be printed;
wherein said amount of pixels is sufficient to trigger application of a bonding agent at said regions, a bonding agent application subsystem of said printing system being configured to apply said bonding agent only at regions where standard colors of said color scheme are to be placed.

19. The method of claim 18, wherein said standard color scheme is a Cyan Magenta Yellow Black (CMYK) color scheme.

20. The method of claim 18, further comprising determining if an input file to said printing system uses a supplemental ink named color, said named color instructing said control system to apply a full value of supplemental ink and said amount of said standard.

* * * * *

UNITED STATES PATENT AND TRADEMARK OFFICE
CERTIFICATE OF CORRECTION

PATENT NO. : 8,454,114 B2
APPLICATION NO. : 13/158035
DATED : June 4, 2013
INVENTOR(S) : Stephen L. Albright et al.

It is certified that error appears in the above-identified patent and that said Letters Patent is hereby corrected as shown below:

In the Claims:

In column 8, line 36, in Claim 20, delete "standard." and insert -- standard color. --, therefor.

Signed and Sealed this
Twenty-seventh Day of August, 2013

Teresa Stanek Rea
*Acting Director of the United States Patent and Trademark Office*